Nov. 1, 1927. G. E. MAXNER Re. 16,779

APPARATUS FOR PILING SHEETS OF PAPER

Original Filed July 7, 1923 2 Sheets-Sheet 1

Inventor.
George E. Maxner
by Jas. H. Churchill
Atty

Nov. 1, 1927. G. E. MAXNER Re. 16,779

APPARATUS FOR PILING SHEETS OF PAPER

Original Filed July 7, 1923 2 Sheets-Sheet 2

Inventor.
George E. Maxner
by Jas. H. Churchill
Atty.

Reissued Nov. 1, 1927. Re. 16,779

UNITED STATES PATENT OFFICE.

GEORGE E. MAXNER, OF WEST END, NEW JERSEY.

APPARATUS FOR PILING SHEETS OF PAPER.

Original No. 1,623,195, dated April 5, 1927, Serial No. 650,131, filed July 7, 1923. Application for reissue filed September 26, 1927. Serial No. 221,864.

My invention relates to apparatus for piling sheets of paper and other light material, and has for an object to provide novel and improved mechanism, for the purpose specified which is particularly adapted for use in piling printed sheets of paper coming from a printing press.

To this end the apparatus is provided with members for engaging the sides of the pile of sheets of paper to exert pressure thereon and thus cause the sheets delivered upon the top of the pile, and also with means for blowing a current of air between the uppermost sheets as the latter are deposited upon the pile. The air thus forced between the sheets operates to provide a cushion for the uppermost sheets, which permits the latter to float down upon the pile and during such movement to be readily moved into a position by the pressure members so as to be more evenly piled and thereby avoid the necessity of hand operation. The current of air also operates to remove the static electricity accumulated upon the sheets during the printing operation, and further serves to dry the printed sheets sufficiently to prevent smutching or offset of the printed sheets.

These and other features of the invention will be hereinafter described and particularly pointed out in the claims at the end of this specification.

In the drawings illustrating a preferred embodiment of the invention, Fig. 1 represents the delivery end of a printing press with which the present apparatus may be used;

Figure 1:
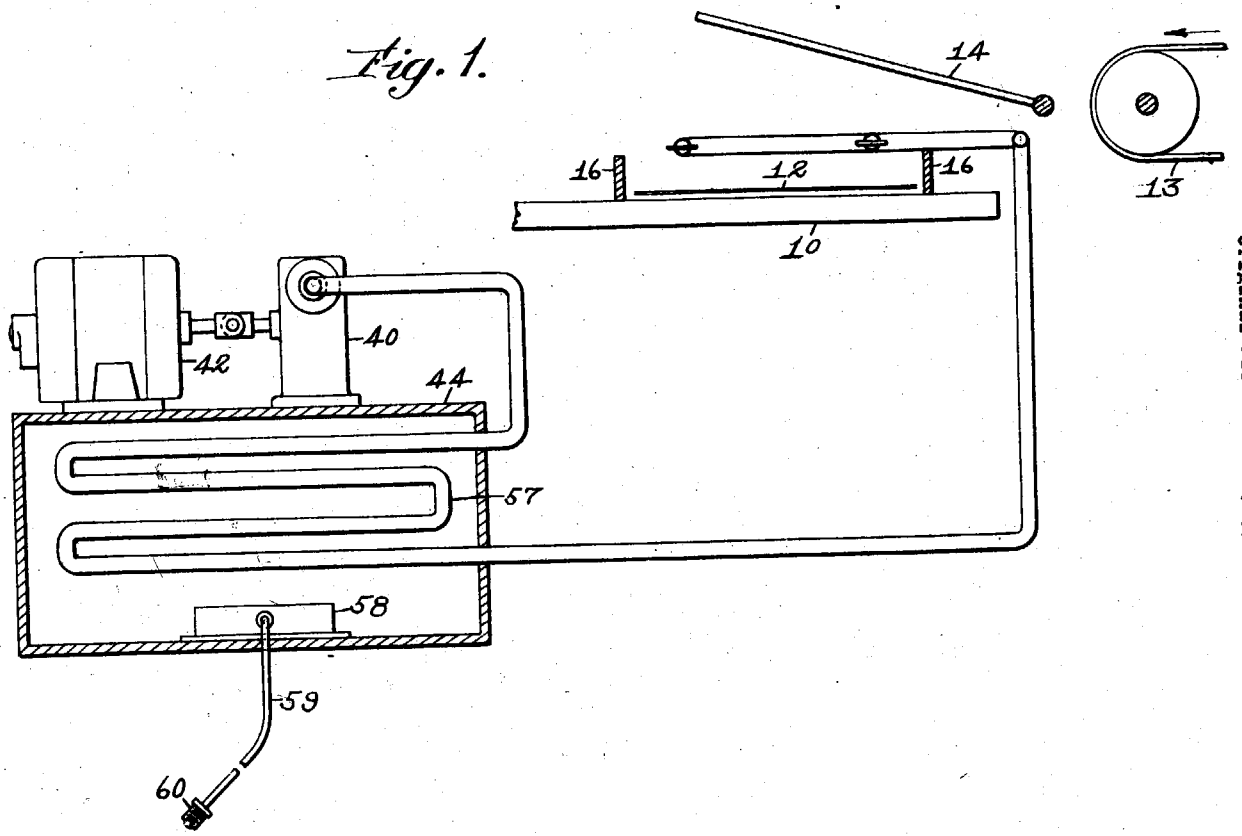
Figure 2:
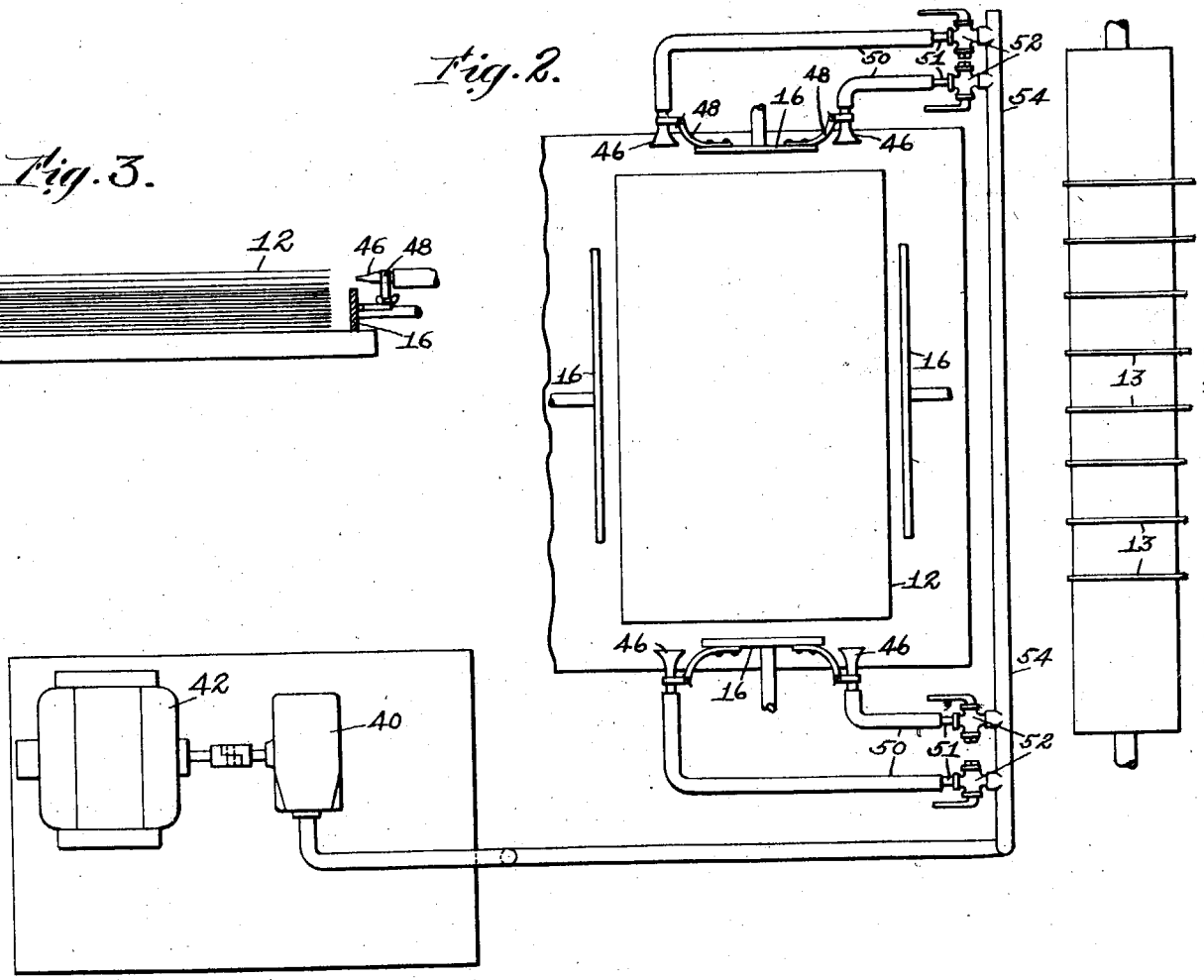
Fig. 2 is a plan of the same.

Referring to the drawings, 10 represents a support or table upon which successive printed sheets 12 may be delivered from a printing press represented by the endless belt 13 and fly 14, in the usual manner. The successive sheets deposited upon the supporting table 10 are piled in a neat pile by means of jogger boards or members 16 which are mechanically operated in known manner, and are arranged to engage and lightly tap the sides of the pile of sheets in a manner well understood.

In order to assist the operation of the jogger boards, provision is made, in accordance with the present invention, for blowing or directing a current of air or other gaseous fluid between the uppermost sheets of paper as the latter are deposited upon the pile on the supporting table 10. The air thus blown between the sheets located in the path of the current of air serves to separate the sheets from one another and to provide a layer of air between adjacent sheets, which forms an air cushion upon which the upper sheet floats and then gradually descends or falls lightly upon the next lower sheet on the pile. During the gradual descent of the sheets, they are readily moved by the jogger boards into current alignment.

The air thus blown between the sheets serves as a cushion for the sheets, causing them to float in air and descend gradually downward or fall lightly upon the next lower sheet on the pile, and during its gradual descent enables the jogger boards to readily move it into correct alignment with the remaining sheets on the pile, so that a neat and correct piling of the sheets is obtained without injury to the sheets and without the necessity of hand operation. In addition the air current serves to destroy the static electricity accumulated upon the sheet during its course through the printing press, thus avoiding liability of accidents and fire risk from this source, and also effecting a sufficient drying of the ink on the sheets to avoid smutching or offset and its attendant losses.

As herein illustrated, the mechanism for blowing the air between the uppermost sheets of a pile comprises a blower 40, driven by a motor 42 supplied with current from any convenient source, and both of which are mounted upon the top of a box 44. A series of discharge nozzles 46 are mounted in position to direct the air emerging therefrom between the uppermost sheets on the pile and as herein shown the nozzles 46 are mounted upon suitable brackets 48 secured to the jogger boards 16. The supporting table 10 upon which the pile of sheets is formed may and preferably will be arranged to gradually descend as the pile accumulates thereon, so that the uppermost sheets of the pile are at all times maintained at a substantially constant level and in the path of the air current. By mounting the discharge nozzles 46 upon the jogger boards 16, the former are maintained at substantially the level of the uppermost sheets in the pile.

The discharge nozzles 46 are each connected by flexible pipes 50 and rigid pipes 51 having control valves 52 therein, to a common header 54 connected with and leading to the blower 40. In order to assist in drying the print upon the paper sheets deposited in the pile from the printing press, provision is preferably made for heating the air before it is discharged between the sheets, and as herein shown, the air delivered by the blower 40 is caused to pass through a heater, herein shown as a coil of pipes 57 positioned within the box 44, and the latter may be provided with an electric heater 58 of any known or preferred construction, having the usual cord 59 and plug 60 for use in the ordinary lighting socket.

Figure 3:
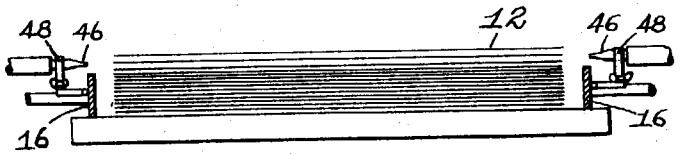
Fig. 3 is a detail showing the operation of the nozzles in connection with a pile of printed sheets.

In operation, as the printed sheets are deposited upon the top of the pile, a current of air is blown under and over the uppermost sheet and also between a small number of the sheets immediately beneath the uppermost sheet, producing a condition such as is illustrated in detail in Fig. 3, in which such sheets are separate from one another and supported by layers or cushions of air, and are permitted to gradually float or settle downward into the pile. This affords time for the jogger boards 16 to operate and align the sheets with the pile, and at the same time enables the sheets to be easily moved by the jogger boards before becoming stationary and a part of the pile. In this manner the sheets may be correctly piled without the necessity of hand operations, and the piling accomplished with maximum efficiency.

While in the illustrated apparatus the invention has been shown as used in connection with a printing press in which the printed sheets are deposited by a fly on to the pile, it may also with advantage be used in connection with printing presses having other mechanisms for delivering the sheets to the pile.

It will also be understood that the invention may with advantage be used for piling sheets of paper and the like in connection with machines other than printing presses.

Having thus described the invention, what is claimed is:

1. The combination with a printing press having mechanism for depositing the printed sheets in a pile, of jogger boards arranged on opposite sides of said pile and movable toward and from said pile to tap opposite edges of each printed sheet as it is deposited on said pile, and air supplying nozzles secured to said movable jogger boards to move therewith and to direct opposing currents of air beneath a plurality of the printed sheets to float the same on cushions of air while they are being tapped by said jogger boards to align them.

2. The combination with a printing press having mechanism to deliver printed sheets in a pile, a pair of nozzles located at each side adjacent the corners of the pile thereof, their orifices being arranged to direct opposing currents of heated dry air across the pile and above and below the sheets as they are piled by the press, means to supply air under pressure and means to heat the air prior to its delivery from the nozzles.

GEORGE E. MAXNER.